(12) United States Patent
Coutinho et al.

(10) Patent No.: US 8,854,378 B2
(45) Date of Patent: Oct. 7, 2014

(54) SYSTEM AND METHOD FOR SIMULATING HAIR AND CLOTH USING POLYHEDRAL-BASED CONSTRAINTS

(75) Inventors: Murilo Coutinho, Los Angeles, CA (US); Armin Bruderlin, Culver City, CA (US)

(73) Assignees: Sony Corporation, Tokyo (JP); Sony Pictures Technologies Inc., Culver City, CA (US)

( * ) Notice: Subject to any disclaimer, the term of this patent is extended or adjusted under 35 U.S.C. 154(b) by 428 days.

(21) Appl. No.: 13/100,901

(22) Filed: May 4, 2011

(65) Prior Publication Data

US 2011/0273445 A1    Nov. 10, 2011

Related U.S. Application Data

(60) Provisional application No. 61/331,243, filed on May 4, 2010.

(51) Int. Cl.

| | |
|---|---|
| *G06T 13/00* | (2011.01) |
| *G06T 15/00* | (2011.01) |
| *G06T 17/00* | (2006.01) |
| *G06T 13/40* | (2011.01) |
| *G06T 13/20* | (2011.01) |

(52) U.S. Cl.
CPC ............... *G06T 13/20* (2013.01); *G06T 13/40* (2013.01)
USPC ............................ 345/473; 345/419; 345/420

(58) Field of Classification Search
CPC ......... G06T 13/00; G06T 13/20; G06T 13/40; G06T 13/80
See application file for complete search history.

(56) References Cited

U.S. PATENT DOCUMENTS

| | | |
|---|---|---|
| 7,468,730 B2 | 12/2008 | Petrovic et al. |
| 2009/0284529 A1 | 11/2009 | De Aguiar et al. |

OTHER PUBLICATIONS

Selle, Andrew, Michael Lentine, and Ronald Fedkiw. "A mass spring model for hair simulation." ACM Transactions on Graphics (TOG). vol. 27. No. 3. ACM, 2008.*
Hirota, Gentaro, Renee Maheshwari, and Ming C. Lin. "Fast volume-preserving free-form deformation using multi-level optimization." Computer-Aided Design 32.8 (2000): 499-512.*
Degand, Christoph, and Charbel Farhat. "A three-dimensional torsional spring analogy method for unstructured dynamic meshes." Computers & structures 80.3 (2002): 305-316.*
McAdams et al., "Crashing Waves, Awesome Explosions, Turbulent Smoke, and Beyond: Applied Mathematics and Scientific Computing in the Visual Effects Industry", vol. 57, No. 5, May 2010, www.ams.org/jackson/fea-mcadams.pdf.
Selle et al., "A mass spring model for hair simulation", Acm Transactions on Graphics, 2008, vol. 27, Issue. 3, http://www.mendeley.com/research/a-mass-spring-model-for-hair-simulation/.
B. Joe., "Construction of three-dimensional Delaunay triangulations using local transformations", Computer Aided Geometric Design 8 (1991) pp. 123-142.

* cited by examiner

*Primary Examiner* — Ryan R Yang
*Assistant Examiner* — Schiller Hill
(74) *Attorney, Agent, or Firm* — Mark D. Wieczorek; Mayer & Williams PC

(57) ABSTRACT

Systems and methods are disclosed to create a realistic and dynamic model of an animated object, such as hair or cloth, by employing control vertices and control entities that make up an animated object. The control vertices are used as polyhedral vertices in the creation of a polyhedral mesh, such as a tetrahedral mesh, and a constraint is employed during simulation in which the polyhedral volume is preserved. Using the systems and methods, the workflow may be significantly improved and costs significantly lowered.

23 Claims, 8 Drawing Sheets

SYSTEM AND METHOD FOR SIMULATING HAIR AND CLOTH USING POLYHEDRAL-BASED CONSTRAINTS

CROSS-REFERENCE TO RELATED APPLICATIONS

This application claims benefit of priority of U.S. Provisional Patent Application Ser. No. 61/331,243, filed May 4, 2010, entitled "VOLUME PRESERVING HAIR SIMULATIONS USING TETRAHEDRON-BASED CONSTRAINTS", owned by the assignee of the present invention and incorporated herein by reference in its entirety.

BACKGROUND

The simulation of hair by a computer is one of the more challenging subfields of computer animation. Prior approaches to solving such simulations were generally laborious and required many iterations to achieve a desired effect. In one method, graphically simulating hair entails generating and manipulating a subset of hairs called control curves, which are often dynamically animated in the shot, and whose shape and motion is interpolated at the time of rendering to generate the final hairs that are viewed on the screen. True hair-hair volume-preserving collision detection of the possibly millions of final hairs is computationally prohibitive. Consequently, the control curves, typically numbering in the hundreds, are rigged and animated to ensure that the desired look and volume are maintained.

One way of performing this step is to create a lattice structure defining the volume of hair, and rigidly binding control curves thereto. A technical director then animates the lattice by hand to match the artistic motion was specified by the director. The resulting movement is then used as a goal by a hair simulation engine to add realistic dynamic motion detail to the already defined coarse motion of the hand animated control curves.

This technique is illustrated in FIG. 1. Referring to that figure, a flow chart 10 is illustrated where a first step is that an underlying model for the hair is defined (step 12). Control curves may then be defined (step 14), and contemporaneously control vertices may be defined on the control curves (step 16). A lattice is then defined, and the control vertices are bound to the lattice (step 18). As noted above, the lattice is then animated by hand to match the artistic motion desired by a director (step 22). A simulation is run to match the hand animation, as well as to add dynamic motion detail (step 24).

This process is difficult and time-consuming, and often requires multiple iterations in order to achieve the desired result.

SUMMARY

The disclosed systems and methods provide an improved system and method for animating hair, and in particular includes a new type of constraint to be employed in a cloth or hair simulation engine. The new type of constraint preserves the volume of each of a number of defined polyhedra during a simulation. The polyhedra, which are typically tetrahedra, are defined between a number of control vertices that in turn represent hair or cloth. In the case of tetrahedra, each tetrahedron may act like a constraint between four control vertices which may be on the same or different control curves. Flexibility in design may be achieved in a number of ways, e.g., by allowing control vertices to belong to multiple constraints, i.e., control vertices may belong to different tetrahedra or even to different tetrahedral meshes. Flexibility may also be achieved by connecting control vertices of different control curves or surfaces.

A technical director for hair or cloth may employ separate controls for stretch and compression stiffness to achieve a wide range of different behavior for the same set of polyhedral constraints. In some cases during a simulation, a polyhedron may flatten, either because of hair geometry, e.g., straight hair, or because of its location on an extremity of the mesh. These degenerate cases may be handled by disabling any springs with a near zero rest length, e.g., a flat tetrahedron or a face with collapsed edges.

Clumps or other agglomerations of hair or cloth, such as ponytails, may be represented by one polyhedral mesh each, with hair-hair collisions between control curves, or cloth-cloth collisions between control surfaces, used to keep the clumps separated.

A specific implementation is described below, in which a tetrahedral mesh is employed with a total of 22 springs that act to preserve the volume of each tetrahedron. It will be understood that, depending on the implementation, this number may vary widely, and vastly different geometries may be employed.

In one aspect, the invention is directed to a method of constraining a hair or cloth simulation, including: in a model in which one or more control entities are defined by control vertices, defining a mesh of polyhedra on a computing system, each polyhedron including a plurality of control vertices; and for each frame in an animation, constraining the movement of the control vertices such that each polyhedron preserves its volume to within a predetermined tolerance.

Implementations of the invention may include one or more of the following. The one or more control entities may be control surfaces such as for animated cloth. The one or more control entities may be control curves, such as for animated hair. The polyhedra may be tetrahedra, and the predetermined tolerance may be plus or minus 5%. The constraining may further include treating interactions between at least some control vertices like spring interactions. Where the polyhedra are tetrahedra, the constraining may further include treating interactions between the control vertices using a model of stretch springs, altitude springs, and shear springs, where the stretch springs extend between control vertices, the altitude springs extend between each control vertex and its opposing face, and the shear springs extend between each control vertex and the mid-point of its opposing edge on the same face. Exemplary numbers of springs may include where the stretch springs number 6, the altitude springs number 4, and the shear springs number 12. The method may further include generating final entities by interpolating between the control entities. The method may further include adjusting the stretch and compression stiffness of the springs, or disabling a spring, whereby a desired effect is achieved. The method may further include defining at least two meshes of polyhedra, where each mesh corresponds to a different clump of hair.

In another aspect, the invention is directed to a non-transitory computer-readable medium, including instructions for causing a computing system to perform the above method.

In a further aspect, the invention is directed to a computing system, including: memory bearing computer-readable instructions capable of defining a mesh of polyhedra to model control entities, each polyhedron including a plurality of control vertices; and memory bearing computer-readable instructions capable of, for each frame in an animation, constraining the movement of the control vertices such that each polyhedron preserves its volume to within a predetermined tolerance.

Implementations of the invention may include one or more of the following. The computing system may further include memory bearing computer readable instructions capable of performing the constraining step by treating interactions between at least some control vertices like spring interactions, as well as memory bearing computer readable instructions capable of generating final entities by interpolating between the control entities. The computing system may further include memory bearing computer readable instructions capable of adjusting a stretch and compression stiffness of the springs, or disabling a spring, such that a desired effect is achieved. The computing system may further include memory bearing computer readable instructions capable of defining several meshes of polyhedra, where each mesh corresponds to a different agglomeration of control entities.

In yet another aspect, the invention is directed to a computing system, including: a control vertex and control entity creation module, whereby a model of an object desired to be animated may be built; a polyhedral mesh creation module, the polyhedra formed by using control vertices as polyhedral vertices; a volume preservation module, to constrain the volume of the polyhedra to within a predetermined tolerance during a simulation; and a fine tuning module.

Implementations of the invention may include one or more of the following. The volume preservation module may constrain the volume of the polyhedra using a model of springs connecting a vertex in one polyhedron to another vertex within the polyhedron or to a face or edge within the polyhedron. The fine tuning module may be configured to perform adjustment of the stiffness or compression of the spring, or to disable a spring.

Advantages may include one or more of the following. The system and method significantly improve work flow and reduce the cost of animating hair or cloth, and are convenient to implement within a hair or cloth simulation engine as a constraint. The system and method provide an effective simulation using a volume preserving polyhedral-based constraint, and allow the convenient achievement of traditionally difficult animations, such as that of ponytails and bunches of hair sliding on the back or shoulder of characters.

Other advantages will be apparent from the following description, including the figures and claims.

BRIEF DESCRIPTION OF THE DRAWINGS

Like reference numerals indicate like elements in the drawings. Elements are not drawn to scale unless otherwise indicated.

DETAILED DESCRIPTION

Systems and methods are disclosed to create a realistic and dynamic model of an animated object, such as hair or cloth, by employing a polyhedral mesh that constrains control vertices that in turn constitute in a coarse way the animated object. The control vertices form polyhedra, and one constraint is that the volume of each polyhedron is preserved during the simulation to within a predetermined tolerance.

Figure 1:
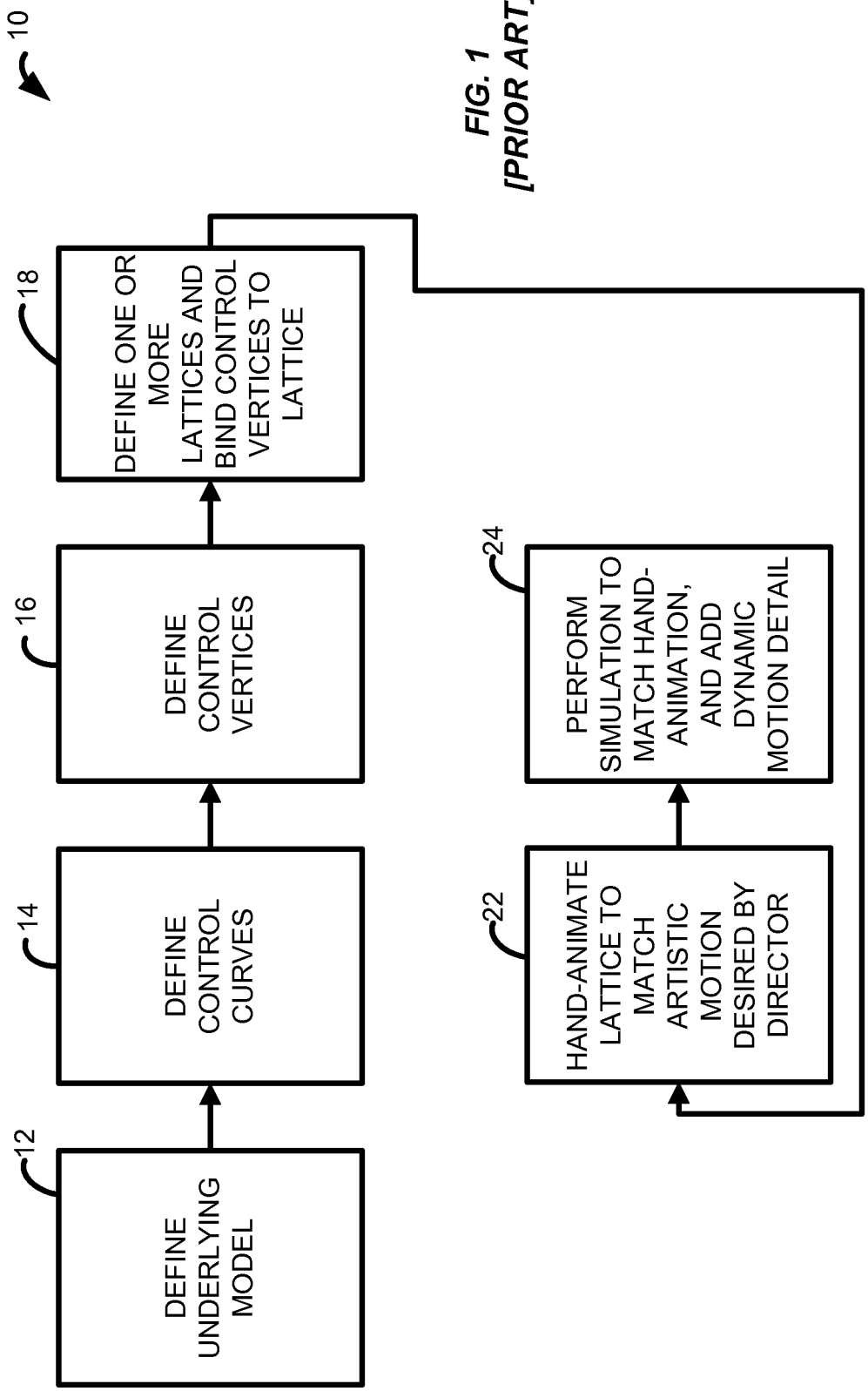
FIG. 1 is a flowchart illustrating a prior art method to perform a hair or cloth simulation.
Figure 2:
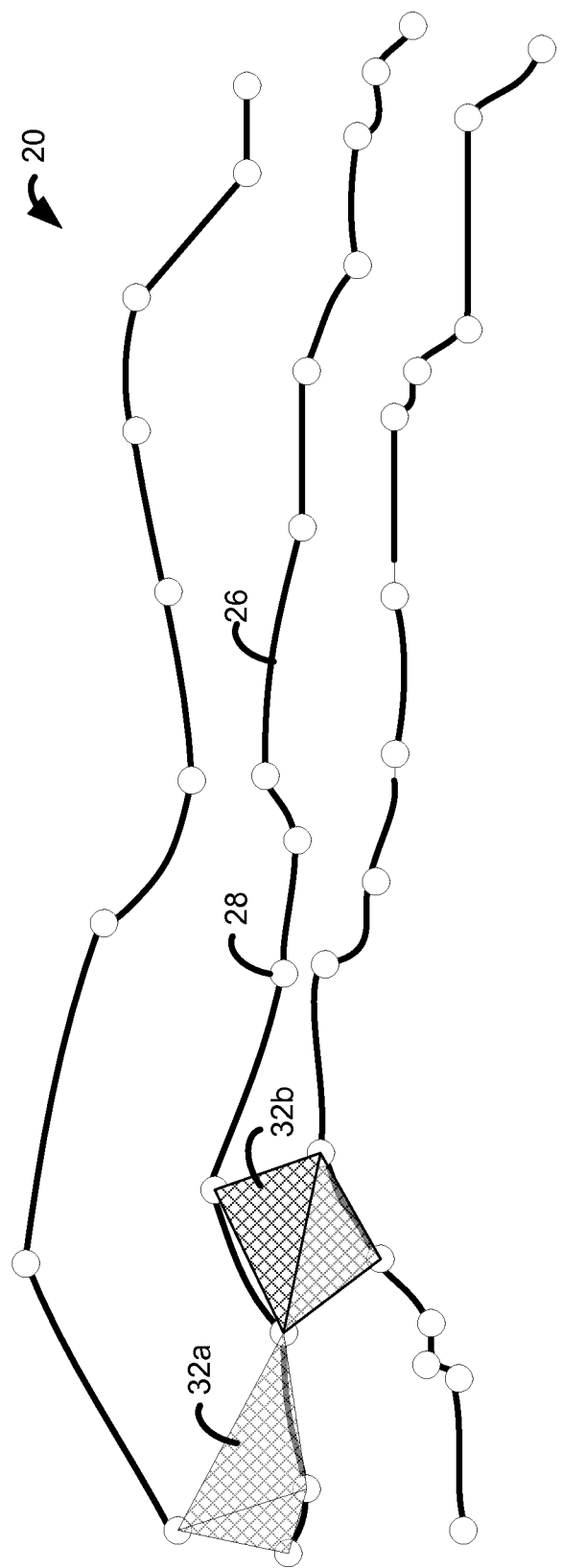
FIG. 2 is a schematic illustration of an exemplary model according to an implementation of the present invention, showing three control curves having control vertices, along with two tetrahedrons defined from four control vertices, including a common control vertex.

Referring to FIG. 2, a set 20 of control curves 26 is illustrated having control vertices 28. The model of FIG. 2 may be generally appropriate for the modeling of animated hair. In this figure, the control curves are generally termed "control entities". In another implementation, control entities may be control surfaces (see FIG. 3). Control entities as control surfaces are generally applicable to the case where cloth is being modeled.

This system and method, including the generation of control entities and control vertices, may form the initial way a given animated hair or cloth is modeled. In some cases, however, control entities and control vertices may have been formed during the generation of an underlying model for the animated object. In these cases, certain aspects of the underlying physical properties of the control entities may be based on the underlying physical model. For example, where control curves are used to model hair, the underlying physical model may take account of the property that hair is generally inelastic. In these cases, therefore, the action of the system and method described here may be superposed on the underlying physical model.

FIG. 2 illustrates two polyhedra 32a and 32b. It will be understood that numerous polyhedra may be constructed using the illustrated control vertices, and far more in an actual system. In FIG. 2, the polyhedra are shown as tetrahedra, but other polyhedra may also be employed. In the system of FIG. 2, tetrahedron may be formed from a control vertex and its three nearest neighbor control vertices, although it will be understood that other ways of constructing polyhedra may be employed. FIG. 2 also illustrates that polyhedra may share a control vertex, i.e., a control vertex may be associated with more than one polyhedra, which as noted above allows for additional flexibility in the design.

A polyhedral mesh may be formed from the set of the individual polyhedra, which in turn connect the control vertices of the control curves. The volume of each polyhedron is preserved to a predetermined tolerance during the simulation. In this way, each tetrahedron acts like a constraint between four control vertices. As noted above, a control vertex may belong to more than one polyhedra and a given polyhedra may include control vertices from different control entities, such as different control curves or control surfaces.

Figure 3:
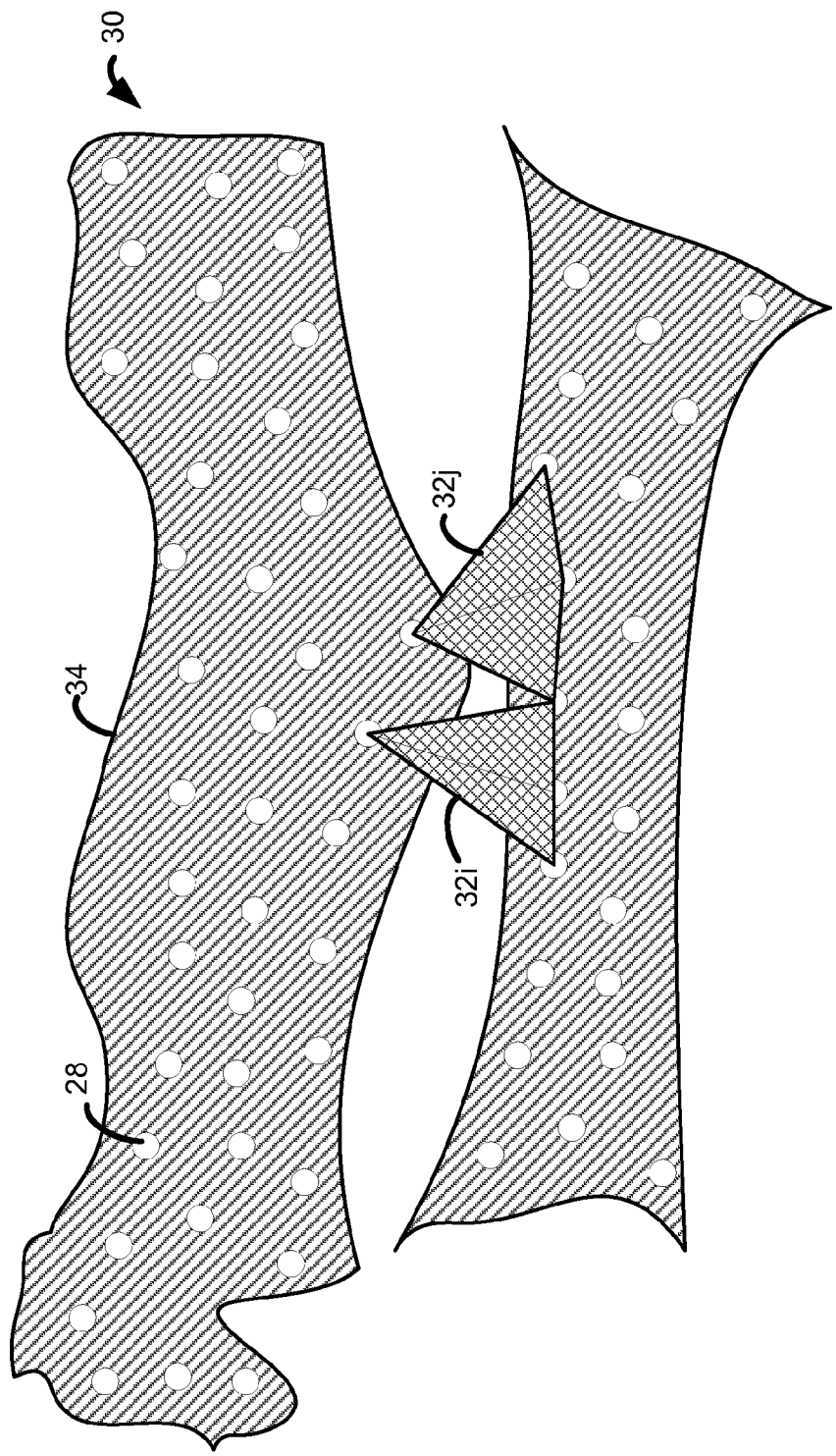
FIG. 3 is a schematic illustration of an exemplary model according to an implementation of the present invention, showing two control surfaces, representing cloth and having control vertices, along with two tetrahedrons defined from four control vertices, including a common control vertex.

FIG. 3 illustrates an appropriate model for cloth simulation, i.e., a set 30 of control surfaces 34. Two control surfaces are shown. Each includes a number of control vertices 28. Two polyhedra 32i and 32j are illustrated, these being formed from control vertices 28, and as in FIG. 2 these polyhedra are tetrahedra. The figure illustrates how control vertices may belong to more than one polyhedra, and a given polyhedra may include control vertices from different control surfaces.

Figure 4:
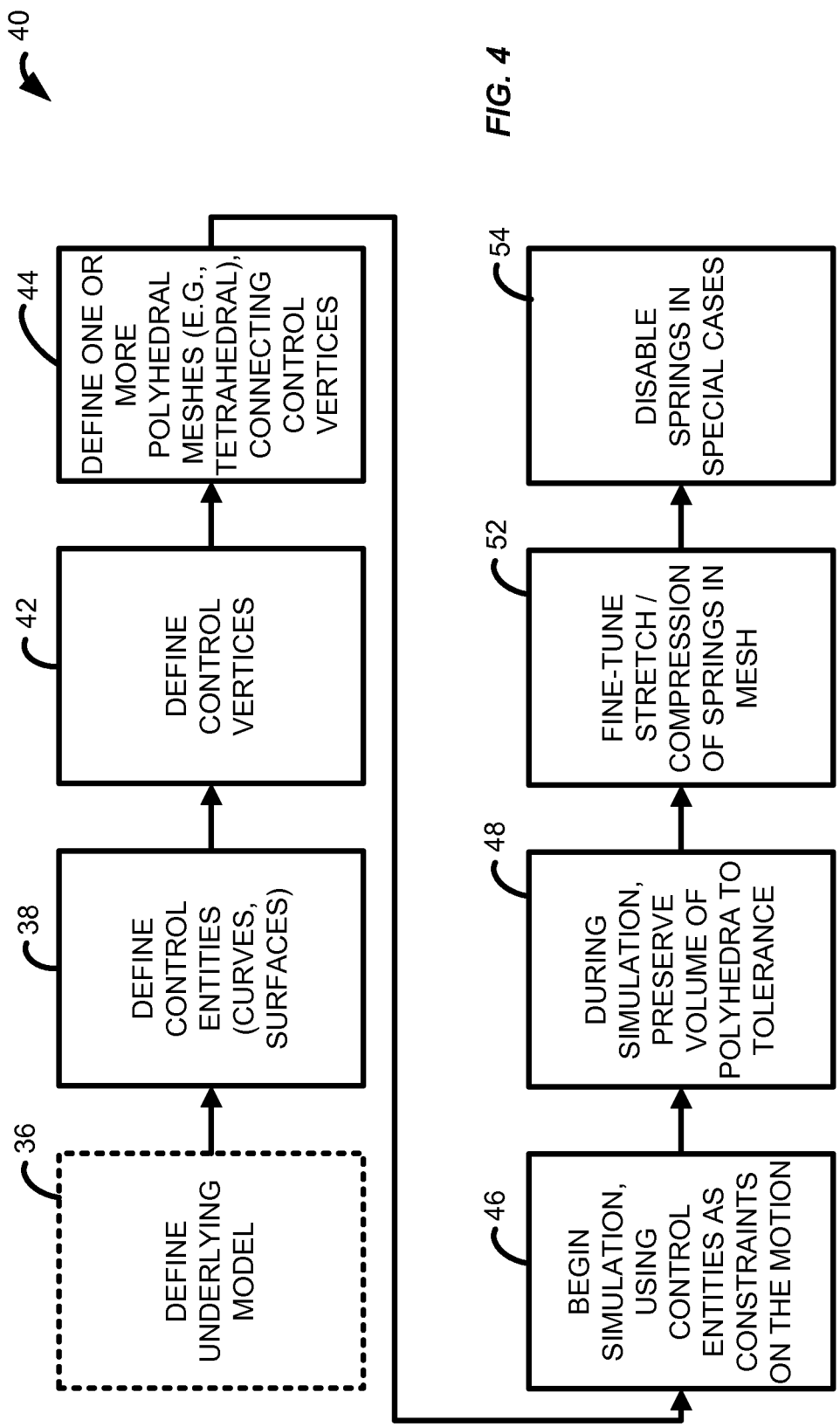
FIG. 4 is a flowchart illustrating an implementation of a method of the present invention.

FIG. 4 is a flowchart 40 illustrating a method that may be employed in an exemplary implementation. In the method, an initial step is the definition of the underlying model (step 36). As noted above, the underlying model may provide control of various aspects of the behavior of control vertices that pertain to its physical nature, e.g., any inherent anisotropy due to the geometry of the underlying physical object. In specific examples, hair has a strong linear anisotropy and cloth has a strong planar anisotropy.

A next step is to define control entities, such as control curves or control surfaces (step 38). Control curves may be employed in the case of animated hair, while control surfaces or control planes may be employed in the case of animated cloth. The control entities are constituted of control vertices, which may also then be defined (step 42). It will be understood that the definition of control entities and control vertices may be part of the step of defining the underlying model or may otherwise be defined at any point prior to the definition of the polyhedra.

A next step is to define one or more polyhedral meshes (step 44). One type of polyhedral mesh that has been found useful is a tetrahedral mesh. The polyhedral mesh includes a number of polyhedra, each polyhedra using a control vertex as a polyhedral vertex. A next step is to begin the simulation using the control entities (step 46), with the option of using the control entities as constraints on the motion. That is, the control entities may be used when calculating collisions during simulation, including the calculation of deformation, and the like.

During the simulation, the volume of the polyhedra is preserved to within a predetermined tolerance (step 48). In other words, during the simulation, the movement of control vertices based on the desired motion, as well as on other factors such as collision and deformation, may be constrained according to the requirement that the volume of each individual polyhedra is preserved. The volume preservation may be to within a predetermined tolerance, such as +/−25%, +/−10%, +/−5%, or to any other value that provides an effect desired by a director.

A step may be employed of fine tuning the behavior between the control vertices. For example, where a polyhedron employs springs that act between control vertices and/or between control vertices and adjoining edges or faces, the fine tuning may act to adjust the spring constant so as to adjust the amount of stretch or compression allowed by the spring (step 52). In this way, a wide range of different behaviors may be obtained for the same set of polyhedral constraints.

In another implementation, the fine tuning may include disabling springs in certain cases (step 54). For example, where a polyhedron is caused to flatten during a simulation, or where polyhedral faces have collapsed edges, springs between control vertices in the flattened plane may be disabled as they have a length of zero or near zero. Once the control vertices are no longer coplanar, the springs may be enabled once again. For hair simulations, such disabling may be appropriate in the case of very straight hair. In general, such disabling may also be appropriate for polyhedra at the extremities of the polyhedral mesh, e.g., at the surface of the animated object.

Figure 5:
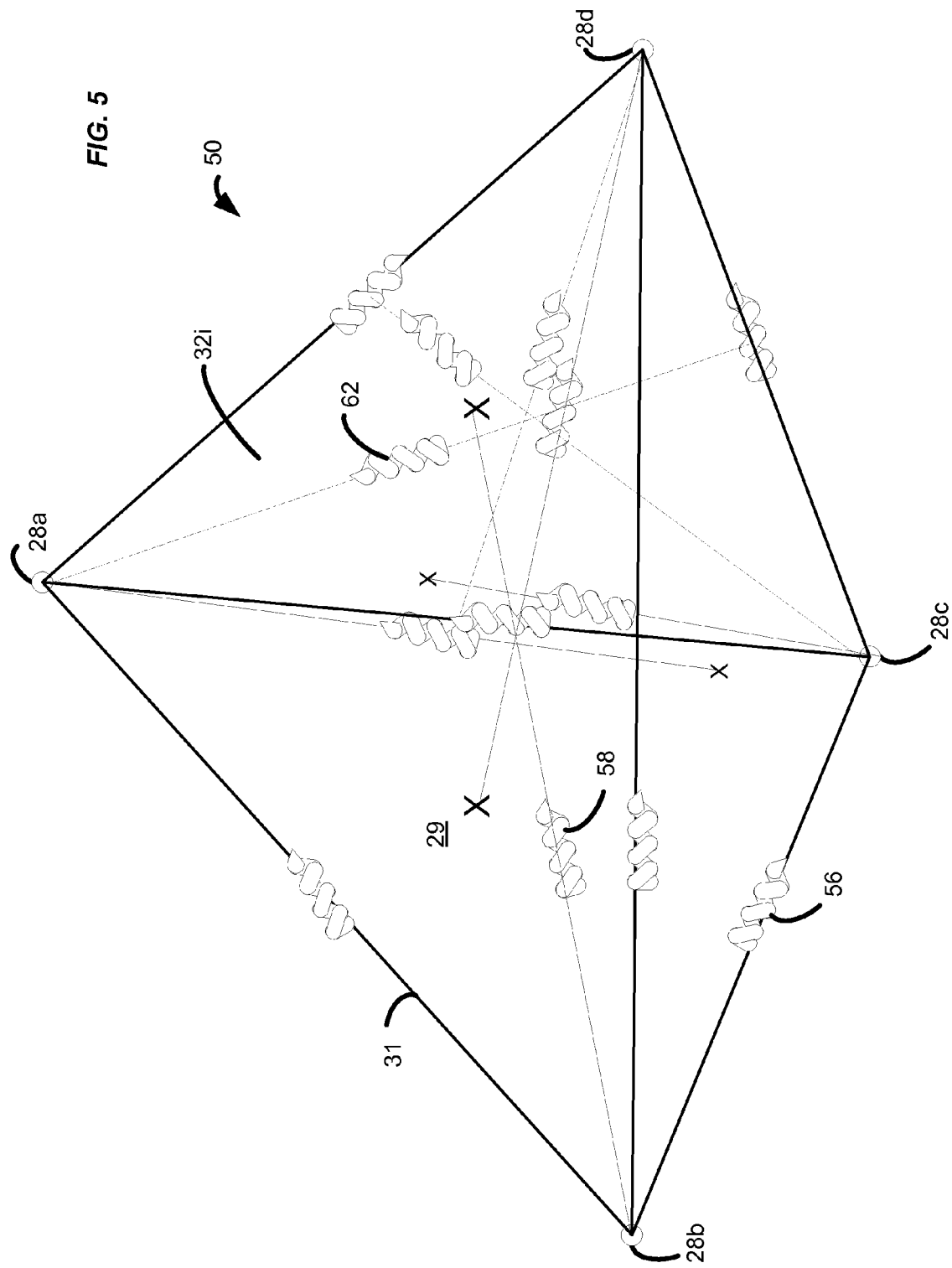
FIG. 5 is a detailed view of a tetrahedron which may be employed in a model of an implementation of the present invention, particularly illustrating the location of springs on which the constraint model is based.

FIG. 5 illustrates details of an exemplary polyhedron 32i, which in this case is a tetrahedron 50. The tetrahedron 50 includes a number of polyhedral vertices, which in this case are the control vertices 28a-28d. As may be seen, the tetrahedron 50 includes four planar faces, e.g., face 29, that are formed between each set of three vertices, as well as six edges 31 that are formed between pairs of vertices. Of course the numbers of edges and faces are set by the degree of the polyhedron, which is equal to the number of faces. In the case of the tetrahedron, the degree is four. If a different type of polyhedron is used, more vertices, faces, and edges will be defined.

In the tetrahedron 50, a number of springs are illustrated. For example, a stretch spring 56 is illustrated between control vertices 28b and 28c. An altitude spring 58 is illustrated between control vertex 28b and its opposing face, the face formed by the plane including vertices 28a, 28c, and 28d. A shear spring 62 is illustrated between control vertex 28a and the midpoint of an opposite edge, e.g., the edge formed by the line connecting control vertices 28c and 28d. Other stretch, altitude, and shear springs are also illustrated, although not all are shown for clarity. In the case where a full set of the above defined stretch, altitude, and shear springs are employed in a tetrahedral model, 22 springs may be used. Of course, it will be understood by one of ordinary skill in the art given this teaching that any number of springs may be employed in a given implementation.

Figure 6:
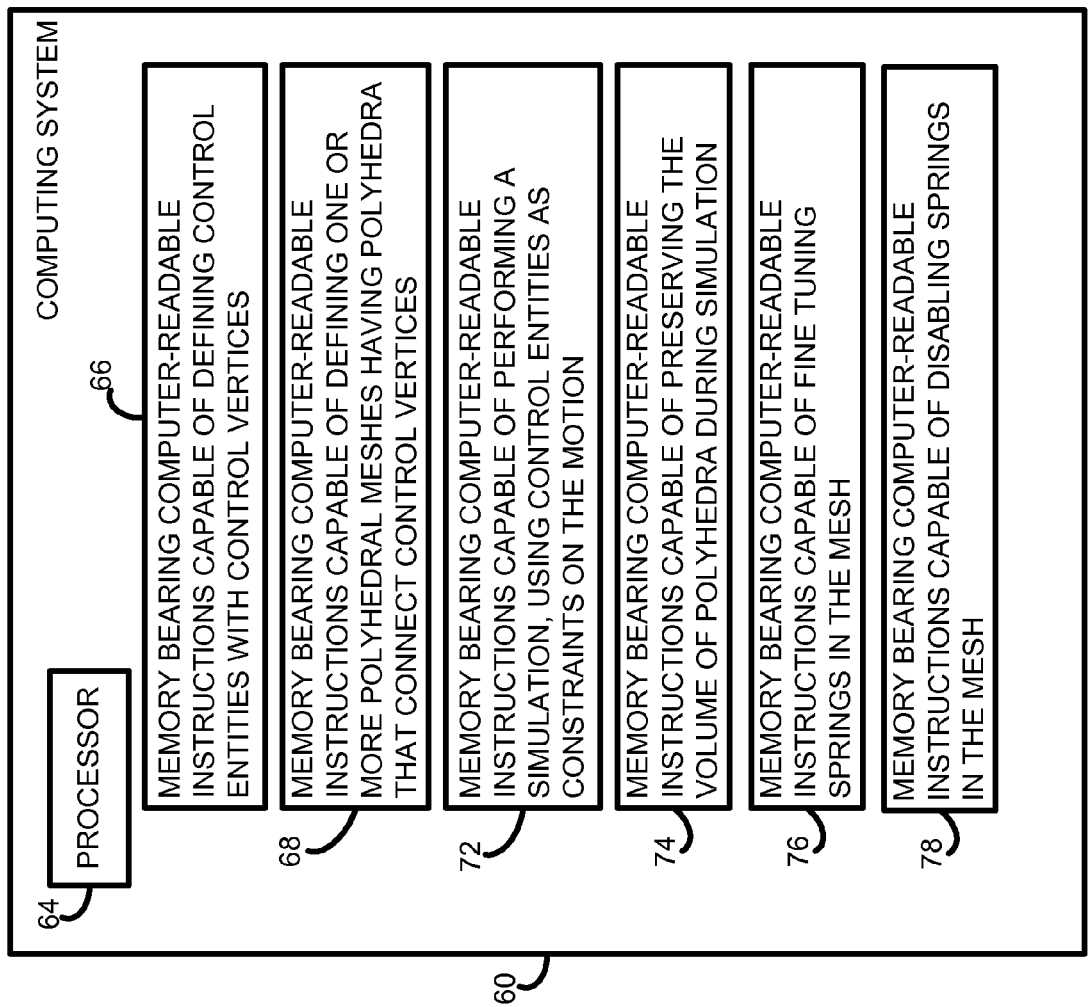
FIG. 6 illustrates an exemplary structure of a computing device that may be employed to implement one or more of the features described herein.

FIG. 6 illustrates a first exemplary structure of a computing system 60 that may be employed to implement one or more of the features described herein. The computing system 60 may correspond to, e.g., an animation workstation. The computing system 60 includes a processor 64 and also includes memory 66 bearing computer-readable instructions capable of defining control entities with control vertices. The control entities may be control curves, control surfaces, or the like. The computing system 60 further includes memory 68 bearing computer-readable instructions capable of defining one or more polyhedral meshes containing individual polyhedra whose polyhedral vertices constitute control vertices. The computing system 60 further includes memory 72 bearing computer-readable instructions capable of performing a simulation, using the control entities as constraints on the motion. For example, if the control entities are control curves representing hair, the simulation would represent the control curves evolving in time, according to the dictates of the director. The computing system 60 may also include memory 74 bearing computer-readable instructions capable of preserving the volume of the individual polyhedra during simulation. The memory 74 may preserve the volume to within a predetermined tolerance as noted above. In so doing, the memory 74 may draw on other memories or a database to retrieve the desired tolerance as well as information about the various polyhedra. The computing system 60 may also include memory 76 bearing computer-readable instructions capable of fine tuning the parameters forming the polyhedra. For example, where springs are employed in the mesh to constrain the polyhedra against overexpansion or overcompression, i.e., to constrain its volume, spring constants may be adjusted using this memory to achieve the desired effect. The computing system 60 may also include memory 78 bearing computer-readable instructions capable of disabling certain parameters forming the polyhedra. For example, where springs are employed in the mesh to constrain the polyhedra as noted above, certain springs may be disabled using the memory 78 to allow for various physical situations to occur and be properly resolved in the simulation, the situations as noted above. It will be understood that other memories may be employed to bear other pertinent information, instructions, and data.

Figure 7:
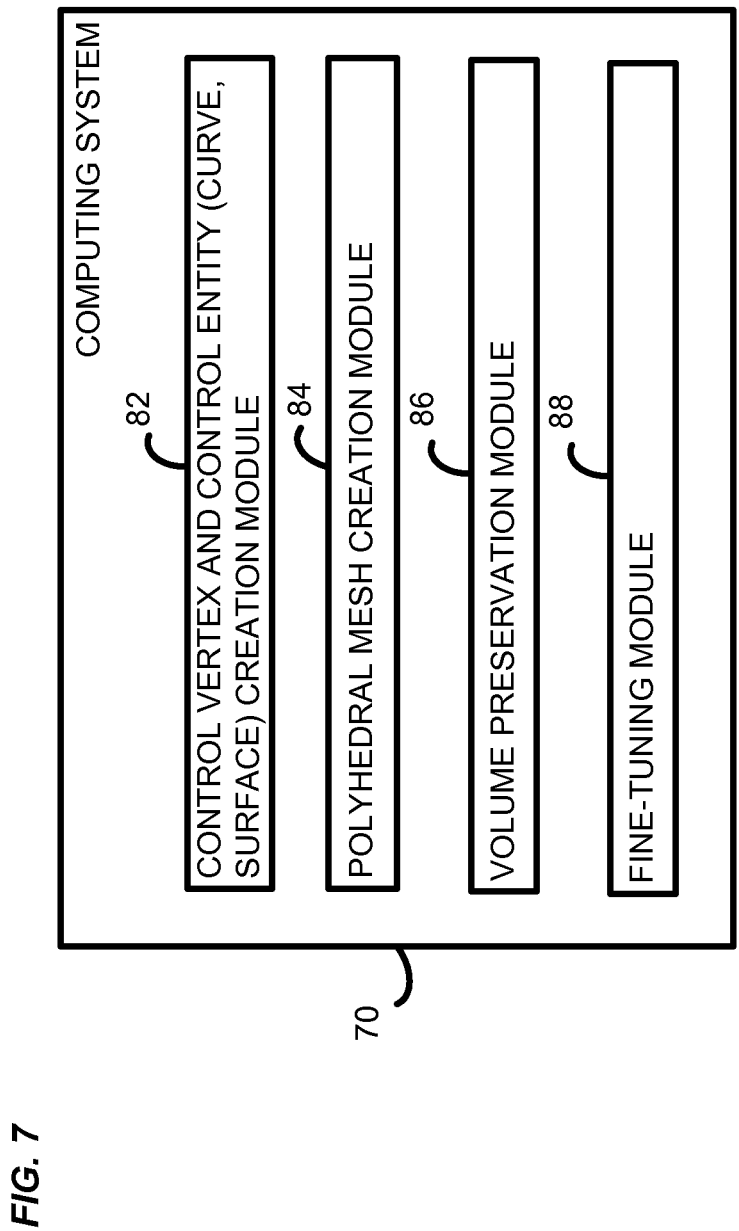
FIG. 7 illustrates another exemplary structure of a computing device that may be employed to implement one or more of the features described herein.

FIG. 7 illustrates a second exemplary structure of a computing system 70 that may be employed to implement one or more of the features described herein. The computing system 70 includes a control vertex and control entity creation module 82. This module may form a portion of the module that creates the underlying physical model, although the module 82 may also be a separate entity. The module 82 creates the control entities from the control vertices, e.g., the same creates control curves, control surfaces, control planes, control volumes, or the like. Another module forming the computing system 70 is a polyhedral mesh creation module 84. The polyhedral mesh creation module 84 creates a number of polyhedra using information about the control vertices. The polyhedral vertices may be the same as the control vertices, or in some cases may also differ. For example, polyhedra may be based not only on control vertices but also on the midpoints of lines connecting control vertices, e.g., nearest neighbor control vertices.

Another module within the computing system 70 is a volume preservation module 86. The volume preservation module 86 is employed to ensure that, during the simulation, the volume of each individual polyhedron is preserved to within the predetermined tolerance. In so doing, during the simulation, the volume preservation module 86 calculates the volume of each polyhedron, as determined by the location of its corresponding control vertices. For each frame in the animation, the volume preservation module 86 constrains the movement of the control vertices such that the volume is maintained to within the predetermined tolerance.

A fine tuning module 88 may also be employed in computing system 70. The fine tuning module 88 may adjust the parameters forming the polyhedra so that the desired effect is achieved. For example, where the polyhedra are constrained using a spring model, the fine tuning module 88 may adjust spring constants to achieve the desired visual effect. In this way, the module 88 affects the stiffness or compression of the springs.

The fine tuning module 88 may also be employed to disable springs, such as in the cases described above, where the physical model and desired motion have forced a polyhedron to be flattened or to have collapsed edges. In general, springs may be disabled for any such degenerate cases, where springs would otherwise have a zero or near-zero rest length. Such cases are common when simulating straight hair, and less so when simulating wavy hair.

Variations of the computing system 70 will be apparent given this teaching. For example, not all of the modules need be located on a single system. In some cases, most or all of the modules may be on separate systems.

Systems and methods have been disclosed which allow the creation of a dynamic model of an animated object, such as hair or cloth, by employing a volume-based constraint on a polyhedral mesh constituting the animated object. Using the systems and methods, the workflow may be significantly improved and costs significantly lowered.

Figure 8:
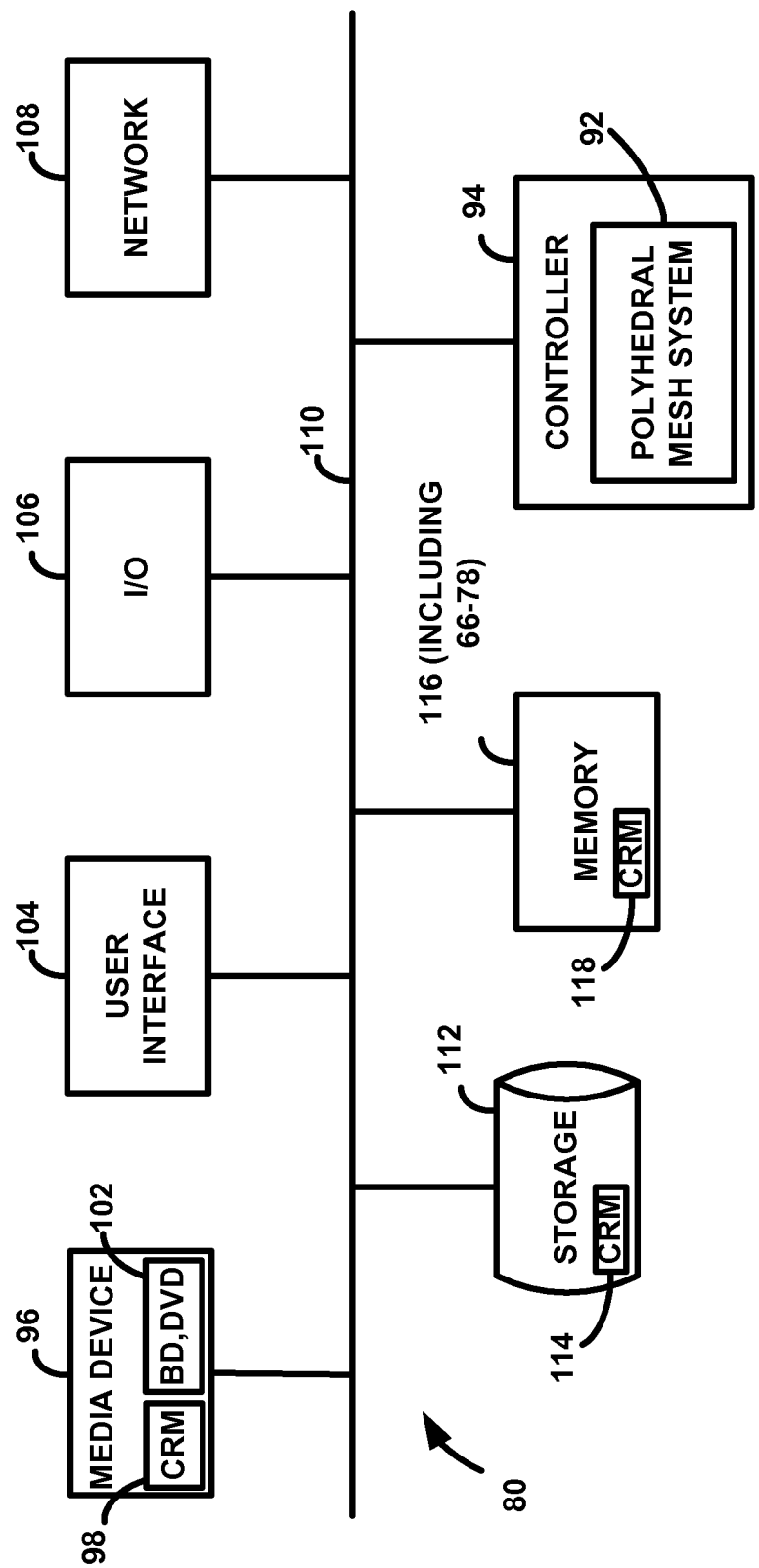
FIG. 8 illustrates yet another exemplary structure of a computing device that may be employed to implement one or more of the features described herein.

One implementation includes one or more programmable processors and corresponding computer system components to store and execute computer instructions, such as to provide an animation workstation or the like. For example, referring to FIG. 8, a representation is shown of an exemplary computing system 80, which may represent any of computing system 60 or 70 or the like. The system 80 includes a memory 116, which may include computer-readable media 118 such as memories 66, 68, 72, 74, 76, and 78 (see FIG. 6). The system 80 may also include a storage area 112, which may include a computer-readable medium 114, a media device 96 for receiving a computer-readable medium 98 such as BD or DVD 102, a user interface 104, an input/output (I/O) interface 106, and a network interface 108 for connection to online resources. These components are interconnected by a common bus 110. Alternatively, different connection configurations can be used, such as a star pattern with the controller at the center.

A controller 94, which may include the processor 64 (see FIG. 6), controls the operation of the system 80 and its components. The controller 94 loads instructions from the memory 116 or an embedded controller memory (not shown) and executes these instructions to control the system. In its execution, the controller 94 may provide the system for simulating hair or cloth using polyhedral constraints. Alternatively, this service can be implemented as separate components in the system 80.

The memory 116 stores data temporarily for use by the other components of the system 80, such as for storing the simulation and taking account of the constraints during processing. In one implementation, memory 116 is implemented as RAM. In some implementations, memory 116 also includes long-term or permanent memory, such as flash memory and/or ROM.

The storage area 112 stores data temporarily or long term for use by other components of the system 80, such as for storing data used by the system for running the simulation and taking account of the constraints. In one implementation, storage 112 is a hard disc drive. In another, storage 112 is a solid state drive or comprises flash memory or the like. Other storage devices will also be understood, including cloud-based storage.

The media device 96 receives removable media and reads and/or writes data to the inserted media. In one implementation, the media device 96 is an optical disc drive or disc burner 102 such as a Blu-ray® drive.

The user interface 104 includes components for accepting user input from the user of the system 80 and for presenting information to the user. In one implementation, the user interface 104 includes a keyboard, a mouse, audio speakers, and a display.

The I/O interface 106 includes one or more I/O ports to connect to corresponding I/O devices, such as external storage or supplemental devices, e.g., a printer or a PDA. In one implementation, the ports of the I/O interface 106 include ports such as: USB ports, PCMCIA ports, serial ports, and/or parallel ports. In another implementation, the I/O interface 106 includes an interface for wireless communication with external devices.

The network interface 108 includes a wired and/or wireless network connection, such as an RJ-45, or WiFi interface (802.11), or an Ethernet connection. Numerous other types of network connections will be understood to be possible, including WiMax, 3G or 4G, satellite, Bluetooth®, or the like.

The system 80 includes additional hardware and software typical of computing devices, e.g., power, cooling, and operating system, though these components are not specifically shown in the figure for simplicity. In other implementations, different configurations of the device can be used, e.g., different bus or storage configurations or a multi-processor configuration.

While the arrangement has been described with respect to a computing device that is an animation workstation, it is to be understood that the arrangement may be implemented in any number of computing devices, including laptop computers, desktop computers, tablet computers, handheld computers, mobile phones, smart phones, and the like.

The examples above are illustrative and not limiting, and variations of the method and system will be understood by one of ordinary skill in the art, given this teaching. For example, while the above description has generally focused on a polyhedral mesh formed from a number of polyhedra, the system and method may be conveniently applied to animated objects requiring multiple polyhedral meshes. For example, for hair simulations, agglomerations of control entities, e.g., clumps of hair such as ponytails, can be represented by one polyhedral mesh each, with hair-hair collisions between control curves used to keep the clumps separate. Any number of such polyhedral meshes may be combined to build up an animated model of arbitrary complexity. And while the description of the system and method have focused on models in which a uniform type of polyhedra has been implemented, e.g., tetrahedra, combinations of different degree polyhedra may also be employed. Moreover, while the description of the system and method have discussed cloth-cloth and hair-hair collisions, it will be understood that the control entities may be employed in resolving collisions between any combination of animated objects, e.g., cloth-hair, cloth-body, hair-body, and so on. Accordingly, the technology is not limited to the specific examples discussed above, which are provided only as example forms of implementing the claims.

The invention claimed is:

1. A method of constraining a hair or cloth simulation, comprising:
   a. in a model in which at least two control entities are defined by respective pluralities of control vertices, the control entities being control curves or control surfaces, the pluralities of control vertices defining a mesh of polyhedra on a computing system, each polyhedron including at least four of the control vertices and at least one polyhedron including at least one control vertex from a first control entity and at least another control vertex from another control entity; and
   b. for each frame in an animation, constraining the movement of the control vertices such that each polyhedron preserves its volume to within a predetermined tolerance.

2. The method of claim 1, wherein the one or more control entities are control surfaces, and wherein the control surfaces represent animated cloth.

3. The method of claim 1, wherein the one or more control entities are control curves, and wherein the control curves represent animated hair.

4. The method of claim 3, further comprising defining at least two meshes of polyhedra, wherein each mesh corresponds to a different clump of hair.

5. The method of claim 1, wherein the polyhedra are tetrahedra.

6. The method of claim 1, wherein the predetermined tolerance is plus or minus 5%.

7. The method of claim 1, wherein the constraining further comprises treating interactions between at least some control vertices like spring interactions.

8. The method of claim 7, wherein the polyhedra are tetrahedra, and wherein the constraining further comprises treating interactions between the control vertices using a model of stretch springs, altitude springs, and shear springs.

9. The method of claim 8, wherein the stretch springs extend between control vertices, the altitude springs extend between each control vertex and its opposing face, and the shear springs extend between each control vertex and the mid-point of its opposing edge on the same face.

10. The method of claim 9, wherein the stretch springs number 6, the altitude springs number 4, and the shear springs number 12.

11. The method of claim 7, further comprising adjusting the stretch and compression stiffness of the springs, whereby a desired effect is achieved.

12. The method of claim 7, further comprising disabling a spring, whereby a desired effect is achieved.

13. The method of claim 1, further comprising generating final entities by interpolating between the control entities.

14. A non-transitory computer-readable medium, comprising instructions for causing a computing system to perform the method of claim 1.

15. A computing system, comprising:
   a. memory bearing computer-readable instructions capable of defining a mesh of polyhedra to model control entities, the control entities being control curves or control surfaces, each polyhedron including a plurality of control vertices, at least one polyhedron including at least one control vertex from a first control entity and at least another control vertex from another control entity; and
   b. memory bearing computer-readable instructions capable of, for each frame in an animation, constraining the movement of the control vertices such that each polyhedron preserves its volume to within a predetermined tolerance.

16. The computing system of claim 15, further comprising memory bearing computer readable instructions capable of performing the constraining step by treating interactions between at least some control vertices like spring interactions.

17. The computing system of claim 16, further comprising memory bearing computer readable instructions capable of adjusting a stretch and compression stiffness of the springs, whereby a desired effect is achieved.

18. The computing system of claim 16, further comprising memory bearing computer readable instructions capable of disabling a spring, whereby a desired effect is achieved.

19. The computing system of claim 15, further comprising memory bearing computer readable instructions capable of generating final entities by interpolating between the control entities.

20. The computing system of claim 15, further comprising memory bearing computer readable instructions capable of defining several meshes of polyhedra, wherein each mesh corresponds to a different agglomeration of control entities.

21. A computing system for animating hair and cloth, comprising:
   a. a processor;
      a control vertex and control entity creation module, running on the processor, whereby a model of an object desired to be animated may be built, and wherein the created control entities are control curves or control surfaces;
   b. a polyhedral mesh creation module, the polyhedra formed by using control vertices as polyhedral vertices, at least one polyhedron including at least one control vertex from a first control entity and at least another control vertex from another control entity;
   c. a volume preservation module to constrain the volume of the polyhedra to within a predetermined tolerance during a simulation; and
   d. a fine tuning module.

22. The system of claim 21, wherein the volume preservation module constrains the volume of the polyhedra using a model of springs connecting a vertex in one polyhedron to another vertex within the polyhedron or to a face or edge within the polyhedron.

23. The system of claim 22, wherein the fine tuning module is configured to perform adjustment of the stiffness or compression of the spring, or to disable a spring.

* * * * *